Figure 2:
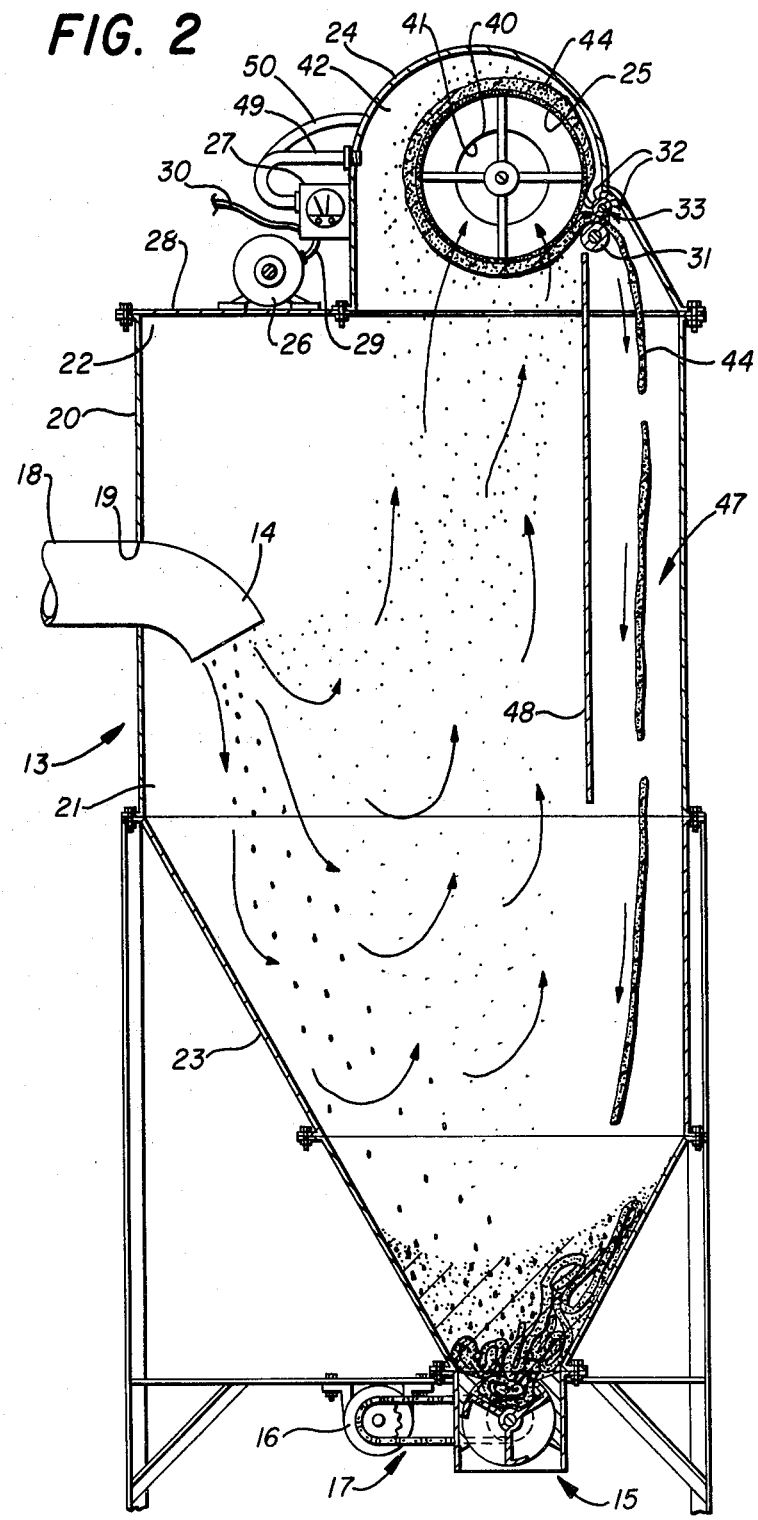

United States Patent [19]

Archer et al.

[11] 4,294,597

[45] Oct. 13, 1981

[54] LINT COLLECTING SYSTEM AND APPARATUS

[76] Inventors: Ronald J. Archer, 3414 Brookglen, Garland, Tex. 75042; Richard V. Fetterly, 12801 Champion Forest Dr., Houston, Tex. 77066

[21] Appl. No.: 131,280

[22] Filed: Mar. 17, 1980

[51] Int. Cl.$^3$ .......................................... B01D 46/04
[52] U.S. Cl. ........................................ 55/283; 55/290; 55/296; 55/301; 55/319; 55/352
[58] Field of Search .................. 55/283, 290, 295–297, 55/301, 351, 352, 319, 328, 432; 19/89, 107

[56] References Cited

U.S. PATENT DOCUMENTS

| 2,643,734 | 6/1953 | Rowell | 55/328 |
| 3,525,198 | 8/1970 | Neitzel | 55/290 |
| 3,628,313 | 12/1971 | Broadbent | 55/283 |
| 3,841,066 | 10/1974 | Wakeen | 55/351 |
| 3,909,222 | 9/1975 | Caughlin et al. | 55/432 |
| 4,054,521 | 10/1977 | Winzen | 55/352 |
| 4,140,503 | 2/1979 | Vandergriff | 55/290 |

FOREIGN PATENT DOCUMENTS

| 450141 | 3/1913 | France | 55/319 |
| 751876 | 7/1956 | United Kingdom | 55/351 |

*Primary Examiner*—David L. Lacey

*Attorney, Agent, or Firm*—Warren H. Kintzinger

[57] ABSTRACT

A central vacuum or air cleaning system handling fibrous materials such as spilled cotton waste in a cotton gin or lint in a textile mill, chaff in grain handling and/or wood dust and dirt in lumber industries and other air contaminating industrial processes. Dirt and lint laden air is drawn into a bin structure with a drum filter or condenser at the top that rotates through an area in operational contact with doffer rolls that remove drum filter deposited lint and dirt to fall down a still chamber provided with an internal plate or baffle extending downwardly from the tower doffer roll a substantial distance approximating one-half the vertical length of the bin. This eliminates pressure differential across the critical area of the doffer rolls that is encountered with filter drum and doffer roll structure delivering deposited lint and dirt waste directly to the exterior. The lint and dirt waste is removed from the bottom of the bin via a rotary air lock, air seal type screw conveyor and/or air plug structure. The interior of the drum filter is exhausted through air piping to a suction fan that, operating on the clean side of the filtering system, permits use of high efficiency fans yielding significant energy savings along with decreased maintenance requirements.

9 Claims, 4 Drawing Figures

U.S. Patent   Oct. 13, 1981   Sheet 1 of 2   4,294,597
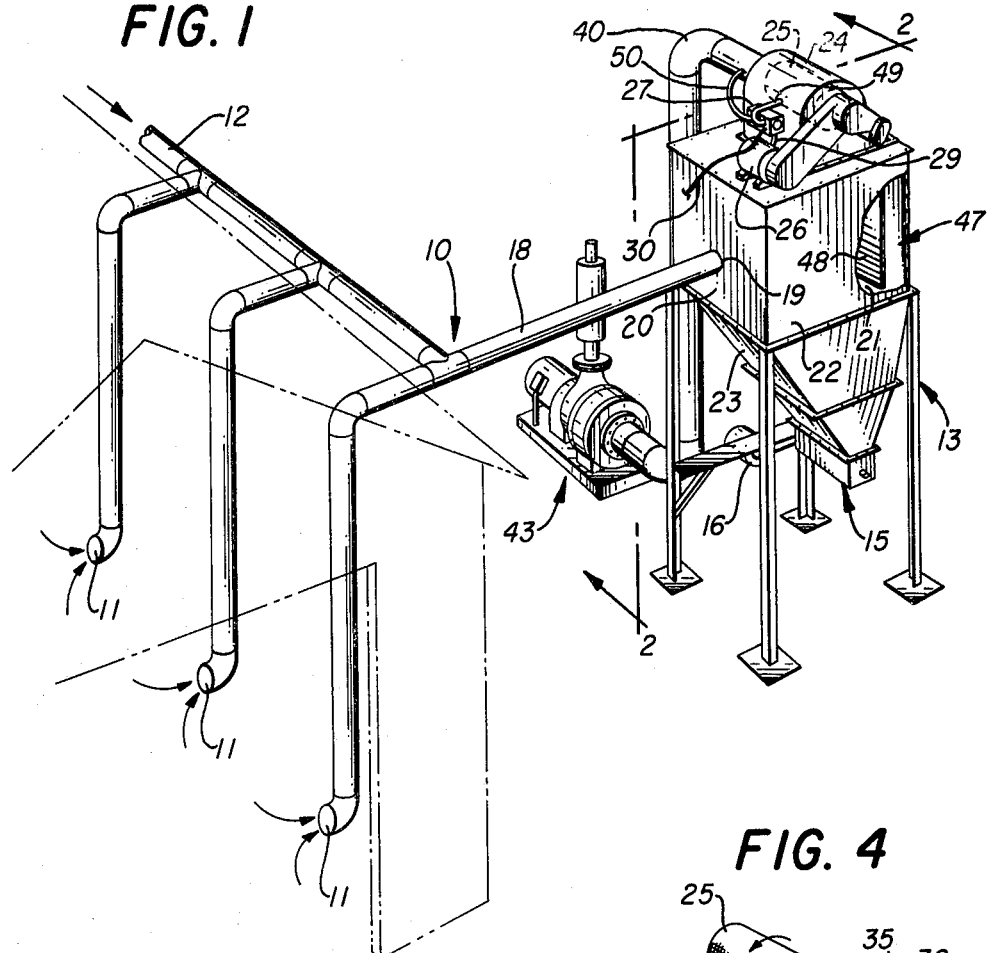
FIG. 1
FIG. 4
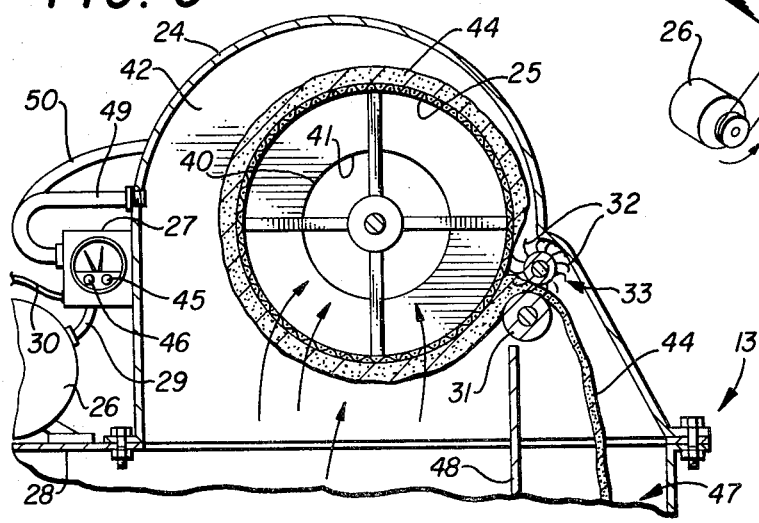
FIG. 3

LINT COLLECTING SYSTEM AND APPARATUS

This invention relates in general to central vacuum or air cleaning systems and, in particular, to a drum filter and bin structure with doffer rolls that remove drum filter deposited link and dirt to fall down a still chamber without excess pressure differential across the doffer roll critical area of the drum filter such as encountered if the doffer roll structure were delivering directly to the atmosphere.

A typical cotton ginning operation relies on an air current in introducing cotton from the field picked state to the gin itself. The cotton gin mechanically removes seeds, sticks, burrs, sand and other debris from the cotton fibers, with seeds removed for further processing and remaining trash blown outside the gin through, heretofore, generally inefficient, dirty, material entrained air handling fans. One approach has been to blow the trash laden air into a bank of cyclones but this has proven to be not very satisfactory. Delivery to bag houses or electrostatic precipatators are also either not continuously effective on fiberous type materials or are much too expensive to warrant serious consideration. With these previous approaches excess power required to run gin fans is a waste with many gin fans operating with mechanical efficiencies down in the 30-40 percent range, an inefficiency factor inherent in use of heavy duty fans handling abrasive material laden air. Further, maintenance costs with such fans is frequent and expensive as a result of constant abrasive wearing of parts. Downtime running to one to two hours for fan replacement, if in stock, is expensive and a critical factor in view of the relatively short ginning seasons. Cyclones are difficult to control in yielding acceptable air cleaning results with the complexity of air volume control inherent in their operation. Through the past what goes on outside the gin has not been considered to be important except to neighbors, but today, it is much more important with air pollution control regulations and standard requirements being imposed to an ever increasing degree. Applicant's structure minimizes or eliminates these various problems in providing a drum filter and bin design capable of operation under relatively high static pressures—negative in the illustrated embodiment. With fans on the clean air side of the filtering device high efficiency fans can be used with utility savings up to 50 percent and fan maintenance reduced by as much as 90 percent. Use of this new structure and system in the ability to handle the high system static pressures opens up another system design which before now could not be handled by conventional methods such as with a baghouse collector. It also makes possible a central vacuum clearning system readily able to handle fibrous materials such as spilled cotton waste in a gin or lint in a textile mill. Fibrous material can be easily doffed from the rotating condenser filter that would tend to hang to fabric filters found in baghouses.

It is, therefore, a principal object of the present invention to provide an improved air or central vacuum cleaning system efficiently removing lint and dirt from air drawn from dirty air environments.

Another object is to increase the possible range of static air pressure being handled and thereby expand the range of process handling capabilities.

A further object is to achieve energy savings through higher efficiency of operation than attained with previous air trash handling systems.

Still another object is to extend equipment life, decrease downtime and minimize maintenance requirements.

Features of the invention useful in accomplishing the above objects include, in a central dirt and lint laden air vacuum cleaning system, a bin structure with a drum filter at the top that rotates through an area in operational contact with doffer rolls that remove drum filter deposited lint and dirt that is delivered to and falls down a still chamber within the bin instead of delivery to the outside atmosphere directly. A rotary air lock at the bottom of the bin is operated periodically to deliver lint and dirt waste from the bin to a carrier container conveyance therebeneath. Air piping extends from the interior of the drum filter to a suction fan, or fans, operating on the clean side of the filter system so as to optimize use of high efficiency fans yielding significant energy savings along with decreased maintenance requirements.

A specific embodiment representing what is presently regarded as the best mode of carrying out the invention is illustrated in the accompanying drawing.

In the drawings:

FIG. 1 represents a partial perspective view of a central vacuum system for a cotton gin;

FIG. 2, a cut away view taken along line 2—2 of FIG. 1 showing bin and filter detail, with doffer roller removal to a still chamber in the bin;

FIG. 3, an enlarged detailed sectioned view of the drum filter and doffer rolls structure feeding lint and dirt collected on the filter drum to the still chamber at the top of the bin; and FIG. 4, a simplified perspective semi-schematic showing of a drive system for the filter drum and the doffer rolls.

Referring to the drawings:

A suction piping system 10 is shown in FIG. 1 such as to be drawing lint and dirt dust laden air into pipe end openings 11 and from elsewhere through pipe or air duct extension 12 for delivery to the interior of bin 13 from a down turned entrained air pipe outlet end 14, as shown in FIG. 2. Some of the heavier particles in the lint and dirt entrained air fall directly to the bottom of the bin 13 above the rotary air lock 15 that is periodically driven to deliver dirt and lint contained in the bottom of bin 13 to conveyance containers therebeneath as desired. Motor 16 is periodically activated to drive the rotary air lock 15 through a sprocket and drive chain drive 17. A screw type conveyor and air plug could be used in place of the rotary air lock 15 with some bin structures.

Pipe 18 terminating in pipe outlet end 14 is passed through opening 19 in wall 20 of bin 13 to the interior of bin plenum chamber 21 that includes an upper rectangular enclosure 22 extending down to the slanted wall portion 23 of the bin 13 that terminates at the bottom at rotary air lock 15. The plenum chamber 21 of bin 13 is open at the top to the open bottom of filter shroud container 24 that encloses a rotatably mounted drum filter 25 that is driven in rotation by motor 26 on an intermittent basis as controlled by a photohelic pressure switch gauge 27 such as shown in U.S. Pat. No. 3,862,416. Motor 26, mounted on the top of top plate 28 of plenum chamber 21 (referring also to FIG. 3), is provided with a power line connection 29 from gauge 27 that in turn is provided with power through line 30 from a power source not shown. A doffing roller set is provided having a smooth surfaced doffing roller 31 and a flighted doffing roller 33 equipped with resiliently flexible flights 32 with both rollers rotatably mounted and extending the length of filter drum 25 and in operational contact therewith. Referring also to FIG. 4, the motor 26 drives the filter drum 25 through a pulley and belt drive 34 (or sprocket and drive chain set) and on through additional pulley and belt drive 35 the doffing roller set with the flighted doffing roller 31 driven faster than the filter drum and in opposite direction thereto. The flighted doffing roller shaft 36 and the smooth doffing roller shaft 37 are interconnected by gears 38 and 39 for drive of smooth doffing roller 31 faster than but in the same direction of rotation as the filter drum 25.

Suction piping 40 extends from fluid communication through opening 41 in the back 42 of shroud 24 to suction fan and motor assembly 43, with thereby the fan located on the clean filtered side of the system. With fans on the clean air side of the filtering device, high efficiency fans are used with utility savings up to 50 percent, and fan maintenance reduced by as much as 90 percent, since heavy duty abrasive material entrained air handling fans are not required.

An airflow system for delivering lint and dirt entrained air enters bin 13 via piping outlet 14 with many heavier particles falling directly to the bottom above rotary air lock 15 from the plenum chamber 21. The remaining lint and dust particles (husks and dust or other processed materials) are carried with suction air flow to the surface of drum filter 25 where batting 44 builds up that also aids in the filtering process. As lint, dust, dirt and air contact the intermittingly revolved screen-covered drum, the air passes through the screen drum and exists through the center rear of the revolving drum filter and on to the suction fan. Since the revolving drum is covered with an extremely fine mesh screen, the lint cannot pass through the screen with the air and is held on the surface of the screen. With intermittent slow revolution of the drum, the lint and dirt continually accumulates on the drum surface, usually to about two inches in thickness. When the entire surface of the drum is covered with the accumulated lint and dirt, the bat formed thereby increasingly becomes a filter media itself more effectively trapping small particles that would normally pass through the fine screen. Thus, the intermittent revolving of the drum will determine the degree of filtration with this degree of filtration (or the thickness of bat) being adjustable as follows:

(a) Turn high pressure and low pressure set knobs 45 and 46 clockwise to increase the set point.

(b) Turn high and low pressure set knobs counterclockwise to decrease the set point.

After substantially the entire surface of the revolving drum 25 is covered and the difference in pressure between inside and outside the screen reaches an adjusted pressure, the switch will actuate an electrical circuit. The product bat is revolved until the pressure decreases. As soon as the above-mentioned difference of pressure again reaches its preset value, the drum will revolve again. As the product bat 44 is revolved, it contacts the smooth doffing roller 31, and after passing this roller, it is compressed to approximately 1.5 inches thick. Directly above the smooth doffing roller is another doffing roller 33, equipped with flexible urethane flights 32, that rotates in an opposite direction from the screen filter drum 25. This roller is located so that the flexible flights 32 contact the screen filter drum 25 and, when rotated, wipe the surface of the screen filter drum 25. The two doffing rollers operate at a greater surface speed than the screen drum to help insure doffing of the bat from the screen drum. After passing through the smooth doffing roller, the product bat is advanced to the flighted doffing roller, which wipes the product bat from the surface of the screen drum. The product bat then is exited from the filter between the two doffing rollers into a still chamber 47.

Still chamber 47 is formed with an internal plate 48 welded in place extending from close adjacency to the smooth doffing roller 31 at the top downward substantially the entire length of the rectangular enclosure 22 to separate the still chamber 47 from the substantial bulk of the plenum chamber 21. This still chamber 47 allows the accumulated material forming bat 44 to fall directly to the bottom of the bin as it is being removed from the drum filter 25.

The bin and drum filter structure presented herein is particularly useful for bin collection and filtering of cotton lint and bulk waste material produced by cotton gins. It is, however, not limited for use with cotton, but is also useful in many feed or grain applications, textile applications, lumber industries, and other industrial processes. This is with the system of modular design that can be easily adapted to fit any size cotton gin or other applications by merely adding additional modules. High-vacuum, high-efficiency fans to move waste materials from within the cotton gin to the bin separator. The direction of the air flow and velocity of the air is changed within the bin separator, thus allowing the heaviest of waste particles to fall to the bottom of the bin. The air containing the balance of light pollutants is then directed through the self-cleaning screen drum with the build-up of cotton lint on the screen drum acting as its own filter media. The self-cleaning mechanism is actuated by a pressure differential switch that energizes the scrubber rolls and turns the screen filter until the pressure differential drops to a suitable preset operating point. Although screen drum filters have been used in previous applications, they were limited to a low pressure differential of approximately "ten inches water column". Pressure differentials higher than this would not allow the matted material to be scrubbed off, as product would cling to the roller and be pulled right back onto the screen drum. However, the present system is designed so that the scrubber rolls are located within the vacuum chamber, thus eliminating any substantial pressure differential between the dirty side of the rubber rolls and the clean side other than the differential through the filter. The scrubber rolls then are able to efficiently remove the matter lint, that then falls through a still chamber to the bottom of the bin collector. All the collected waste at the bottom of each bin separator is then removed by mechanical means into a waiting waste truck or waste hopper.

The filtered air, after leaving the screen drum, is taken into a high efficiency fan and then exhausted to the atmosphere, to thereby offer very effective compact air filtration through the use of high-efficiency fans located on the clean air side. The use of high-efficiency fans is possible because scrubber mechanisms have been located within the collection bin by the use of a still chamber. Economic savings are attained because the drum filter is continuously being cleaned, with its physical size kept to a minimum as compared to large baghouses or air scrubbers. Because fans have been located on the clean air side of the system, more efficient fans can be used to reduce power consumption significantly.

Also, by eliminating the use of fans that require material to pass through them, costly fan replacement or repair expenses are minimized, not to mention limited costly downtime incurred in repairing or replacing fans.

The photohelic pressure switch gauge 27 is connected to sense the pressure in the bin 13 through air line 49 and the pressure of the clean air out of the filter through air line 50 connected to piping 40.

It is of interest that existing drum filtering systems have been limited generally to ten to fifteen inches of water static pressure. Applicant's new structure makes possible operation to as much as fifteen inches of mercury static pressure in not only negative pressure systems but positive pressure systems as well (detail not shown). Thus, a system is presented allowing for filtration of fibrous materials with stronger process negative pressures than heretofore with expanded use in cotton ginning, garment and textile processing and pulp and paper processing, along with other processes not mentioned.

Whereas this invention is here illustrated and described with respect to a specific embodiment thereof, it should be realized that various changes may be made without departing from the essential contributions to the art made by the teachings hereof.

We claim:

1. In an air cleaning system having a rotary filter means and bin structure: said bin structure comprising, a bin with a plenum chamber; said filter means comprising roller filter means mounted in the top of said bin plenum chamber; doffer roller means for removing bat deposited on said roller filter means; air flow system means for delivery of particle laden air to said bin plenum chamber, and developing a pressure differential across from a first side to a second side of said roller filter means and for exhausting air from the second side of said roller filter means and from said bin; barrier wall means within said bin extending down from said doffer roller means through a substantial vertical distance within said bin to provide a still chamber generally separate from said plenum chamber, with bat removed from said roller filter means falling through said still chamber to the bottom of said bin and air lock means for removing deposited material from bottom of said bin.

2. The air cleaning system rotary filter and bin structure of claim 1, wherein said roller filter means is a roller screen type filter mounted for rotary movement within said bin; and drive system means for driving said roller filter in rotary movement, also extending to driving connection with said doffer roller means.

3. The air cleaning system rotary filter and bin structure of claim 2, wherein said drive system means includes a ratio step up drive, driving said doffer roller means for faster roller circumferential speed than the circumferential speed of said roller filter means when said drive system means is drive activated.

4. The air cleaning system rotary filter and bin structure of claim 3, wherein pressure switch gauge means has a first air line connection to said first side and a second air line connection to said second side of said roller filter means and subject to activation by predetermined differential set pressures imposed through said first air line connection and through said second air line connection to pressure switch gauge means to activate said drive system means for driving said roller filter means and said doffer roller means on an intermittent basis; with bat made up of air deposited debris buildup aiding in the filtering process through said roller filter means to the point that differential pressure between said first side and said second side of said roller filter means activates said pressure switch gauge means for drive of said drive system means.

5. The air cleaning system rotary filter and bin structure of claim 4, wherein said doffer roller means for removing bat deposited on said roller filter means includes a smooth-surfaced roller, and a roller mounting a plurality of longitudinally extended flexible material flights rotated, when the roller is driven, in the opposite direction from the direction of rotation of said smooth-surfaced roller and said roller filter means.

6. The air cleaning system rotary filter and bin structure of claim 5, wherein said air flow system means for delivery of particle laden air to said bin plenum chamber includes: first piping means extended through wall means of said bin and having an air outlet within said plenum chamber with the plenum chamber being on said first side of said roller filter for air flow to and through screening of said roller filter to the interior space of said roller filter that is contiguous to said second side of said roller filter; second piping means in fluid communication with the interior space of said roller filter within the second side of said roller filter; and blower means positioned in said air flow system means for developing differential pressure across said roller filter for air flow from said first side of said roller filter to said second side of said roller filter.

7. The air cleaning system rotary filter and bin structure of claim 6, wherein said blower means is suction fan means located in said second piping means; and drive means for said suction fan means.

8. The air cleaning system rotary filter and bin structure of claim 6, wherein said roller filter means is mounted in a roller filter shroud enclosure above said plenum chamber and in open fluid air communication with the bin plenum chamber enclosure.

9. The air cleaning system rotary filter and bin structure of claim 6, wherein said air lock means is a rotary air lock structure.

* * * * *